J. E. SWEET.
Screw-Taps.
No. 166,318. Patented Aug. 3, 1875.
Fig. 1. Fig. 2. Fig. 3. Fig. 4.
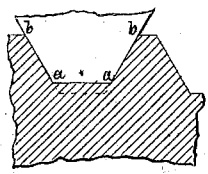 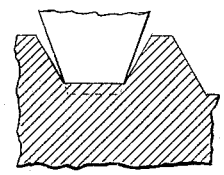 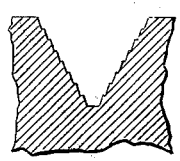 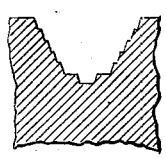
Fig. 5. Fig. 6. Fig. 7.
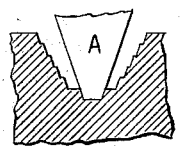 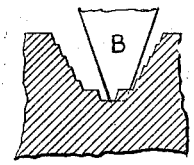 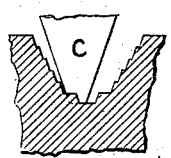
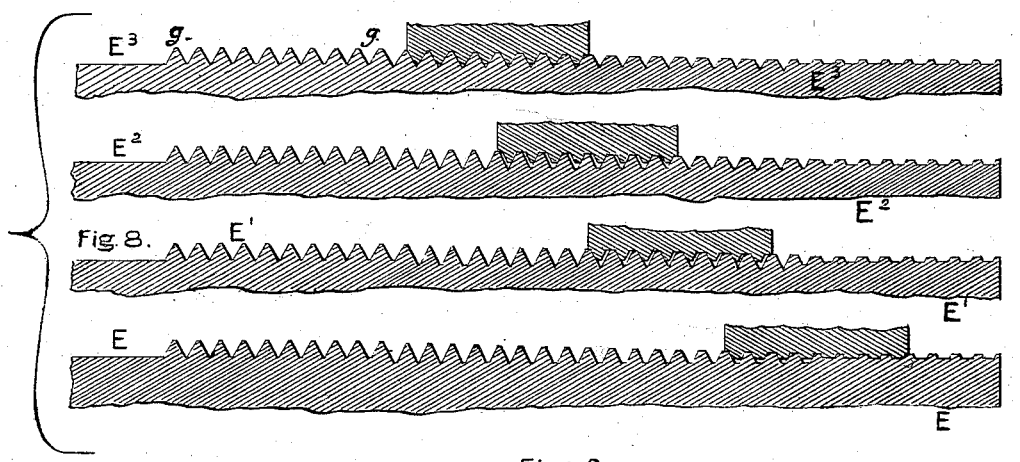
Fig. 8.
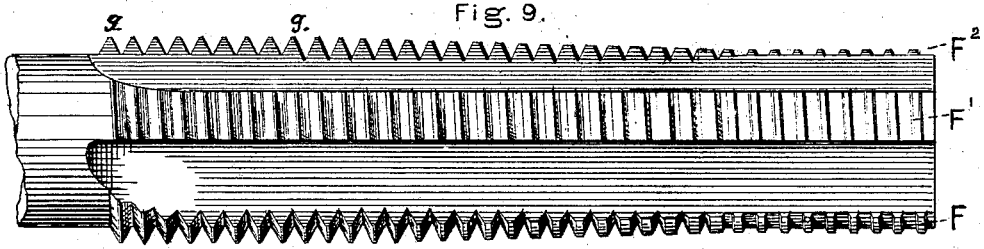
Fig. 9.
WITNESSES
John E. Sweet
INVENTOR.

UNITED STATES PATENT OFFICE.

JOHN E. SWEET, OF ITHACA, NEW YORK.

IMPROVEMENT IN SCREW-TAPS.

Specification forming part of Letters Patent No. 166,318, dated August 3, 1875; application filed April 28, 1875.

*To all whom it may concern:*

Be it known that I, JOHN EDSON SWEET, of Ithaca, in the State of New York, have invented certain Improvements in Screw-Taps, of which the following is a specification:

This invention has for its object the reduction of the now very great and useless friction existing in screw-taps in the operation of cutting screw-threads in nuts or holes; or, in other words, it may be said to be the production of a frictionless screw-tap.

In all the processes of metal-cutting probably there are few, if any, where the amount of power expended or time consumed is so great in proportion to the amount of metal removed as in the process of cutting screw-threads by die-stocks, and the tapping of nuts and holes with the ordinary fluted taps. This is, no doubt, mainly due to three comprehensive causes, viz: first, that of the uselessly minute subdivision of metal removed; second, the excessive friction of the threads of the tap on the finished threads of the nut; and, third— probably the greatest of all—that some of the teeth of the tap, not cutting at all, but sliding over the metal, not only cause friction, but burnish down the metal, and thereby make the work so much the harder for the following tooth or cutter.

If we take, for example, a four-fluted standard inch-taper tap, the length of the taper being equal to three diameters of the bolt, there would be no less than ninety-six cutting-teeth to remove the stock to the depth of about five-sixty-fourths of an inch, from which it is evident that if each cutter removes its allotted amount it is cutting it very fine; but if some of the cutters slip over their services could be dispensed with.

Now, what is meant by the friction between the sides of the tap and the sides of the finished thread in the nut will be understood by a reference to Fig. 1 in the accompanying drawings.

Assuming the metal to have been removed by the previous cutters, as shown, and the following cutter to be removing the stock down to the dotted line, (the amount of which is greatly exaggerated, for the purpose of plainly illustrating the problem,) it not only does the work of cutting the metal, but rubs along the side of the already finished groove, as from *a* to *b;* whereas if the cutter be formed as shown in Fig. 2, the real work would be performed, if anything, easier than before, and with no friction at all above that point. If, then, a full groove be cut with different cutters, each formed to work on this principle, the completed groove would have the appearance shown in Fig. 3, (each step representing the depth to which each cutter worked in the operation,) and then scarcely more than a single cutter would be required to pare down the sides of such a groove and make a smooth finish, and each cutting-edge would work nearly frictionless, which, as has been already stated, is the object of this invention.

The invention, therefore, consists in forming a tap with a series of teeth or cutting-edges at an angle less than the angle between the threads, and so arranging them relatively to each other that the friction will be relieved on the sides alternately, and greatly reduced on the bottom, as will hereafter appear.

A four-fluted inch tap completing a thread in a distance of only two diameters in length would have only, by the old system, sixty-four cutting-edges, and these, to remove five sixty-fourths of an inch, would give to each an amount vastly less than that represented for each cutter in Fig. 3. But suppose the amount of stock to be removed by three following cutters to be equal to that therein represented; then, by this invention, the groove would be formed as represented at Fig. 4, and the operations would follow each other as represented at Figs. 5, 6, and 7, where the first tooth or cutter, as at A, Fig. 5, cuts out a groove or chip in the center of the groove to be formed, and then B, in Fig. 6, cuts to the same depth, but on one side, and the next or third tooth or cutter, as at C, Fig. 7, cuts out the other corresponding corner, and so on, until the groove is carried to its proper depth; and, in the meantime, these three are followed by a fourth tooth or cutter, to trim the sides and finish the threads.

It must be evident to any mechanic that in such a construction the metal would move from its seat more freely, and each cutting-edge would have so much of a chip to remove that its liability of burnishing would be greatly diminished. Now, to produce such a tap the following method may be adopted, as one that has proved very successful: Make the blank for the tap, or the part for the threads, four diameters in length, and cut the thread in the usual way, and form the taper so that one diameter of the tap will enter the hole to secure a straight start, and leave one diameter at the other end full size to insure a parallel finished hole. This will leave two diameters to do the work of cutting chiefly. Then color the blank either by a low heat or acid fumes, or in other suitable manner, so that the next operation can be more easily observed. Then set the tail-center of the lathe back from the center—that is, to the reverse from the position it had when turning the taper on the tap; then, with a tool some degrees more acute than the one used for cutting the thread at first, work out the bottom of the thread until a new angle is given to all the teeth or cutters up to the last diameter, which should remain untouched. If the angle of the tool and the distance the tail-center is set back be rightly proportioned to each other and to the first thread, all the threads will receive the new angle at the same cut of the tool.

To give the second element of relief, the tap is then fluted in the ordinary way, and if made with four flutes one row may be used for cutting out the center of the groove, and the threads of this row may be filed off or reduced to about one-third their first width, as shown at Fig. 8, at the row marked E; then reduce at the next row on one side, as at $E^1$, Fig. 8; and the next row as at $E^2$, Fig. 8; and the last row, as at $E^3$, leave full to trim out the sides, as already explained from Figs 3 to 7. But if only three rows be used, or the tap be made with only three flutes, then the alternate teeth or cutters are to be so dressed instead of making the same reduction in each row, and this may also be done in the use of any number of flutes or rows; but the plan described is believed at present to be the easiest.

At Fig. 9 is represented a tap showing the three first rows of teeth or cutters finished according to the foregoing description, and the teeth at F, Fig. 9, are intended to cut out the center of the groove, or as represented in the enlarged form at Fig. 5, and the next row at $F^1$, Fig. 9, is to cut out one side, as shown at Fig. 6, and the next row, at $F^2$ of Fig. 9, is to cut out the other side of the groove, as at Fig. 7, and the remaining row (not shown at Fig. 9) is to finish the work of cutting the grooves, which may be cleaned out and polished in the ordinary way by the threads left untouched in the diameter next the shank, and shown at $g\ g$, Figs. 8 and 9.

The usual relief to the back of the cutting-edges may be given with such a construction, and with as great advantage as is found in the common method. Other methods of formation may also be adopted without departing from the nature of my invention, and I have found in practice that both the power and time required in forming threads with such taps are very greatly reduced.

I therefore claim—

A screw-tap formed with cutting-threads or sections thereof, released on the sides alternately, and with threads or cutting-points working centrally, as described, and for the purposes set forth.

JOHN E. SWEET.

Witnesses:
B. HERMON SMITH,
E. F. CHURCH.